W. SAY.
FENDER FOR MOTOR CARS.
APPLICATION FILED DEC. 26, 1913.
1,108,795.
Patented Aug. 25, 1914.
2 SHEETS—SHEET 2.
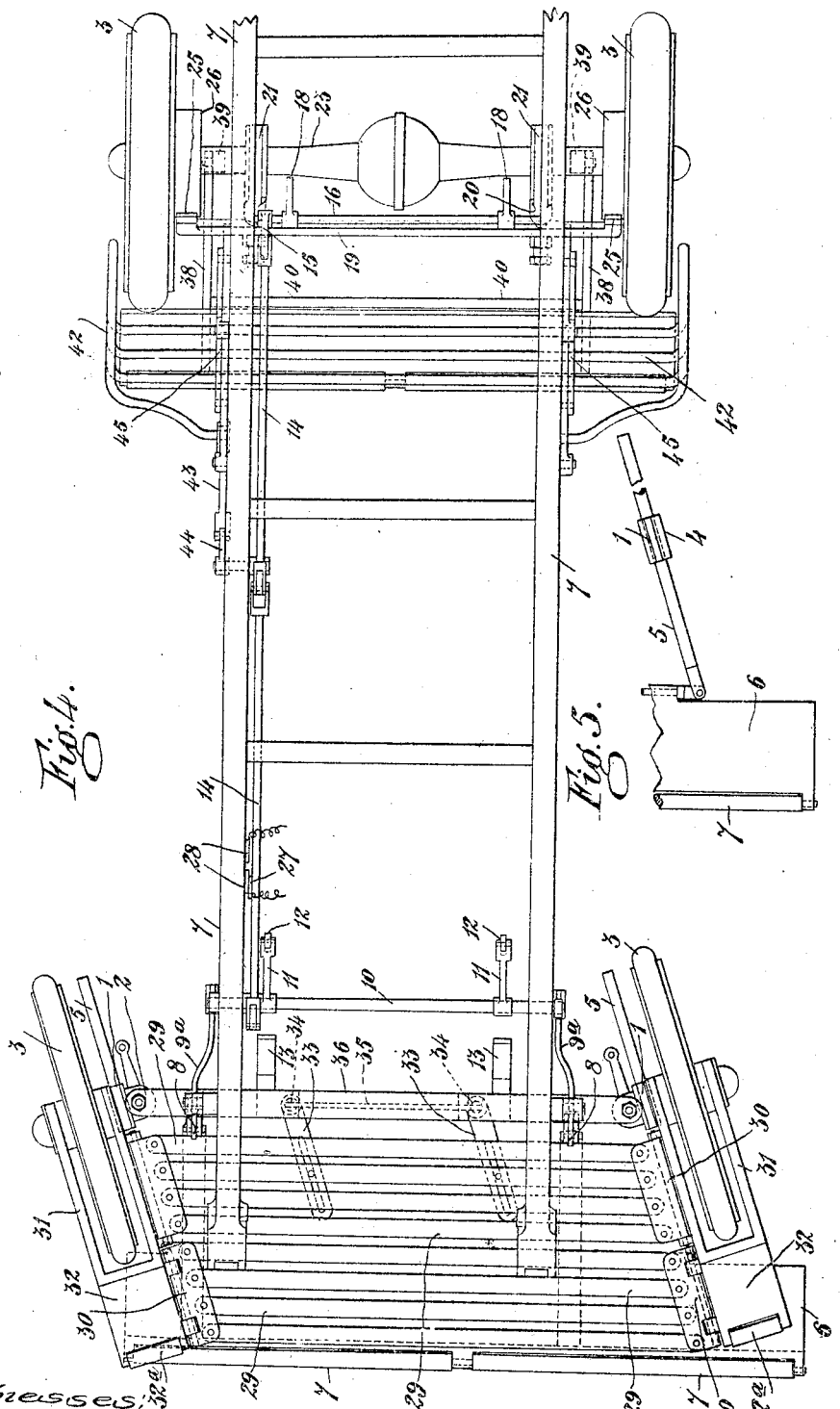

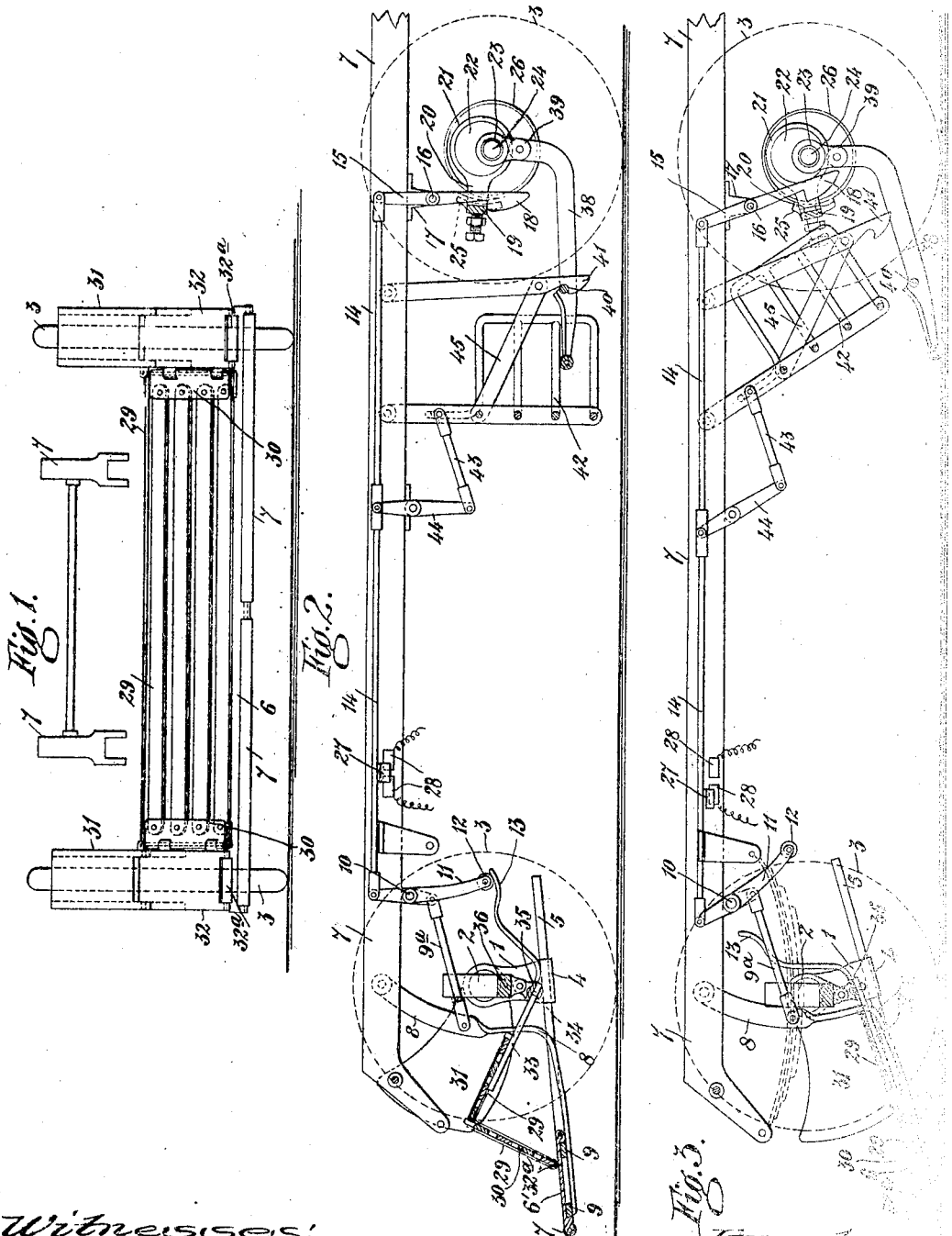

UNITED STATES PATENT OFFICE.

WILLIAM SAY, OF LONDON, ENGLAND.

FENDER FOR MOTOR-CARS.

1,108,795.  Specification of Letters Patent.  Patented Aug. 25, 1914.

Application filed December 26, 1913. Serial No. 808,883.

*To all whom it may concern:*

Be it known that I, WILLIAM SAY, a subject of the King of Great Britain, residing at London, England, have invented certain new and useful Improvements in Fenders for Motor-Cars, of which the following is a specification.

The object of my invention is to construct a fender for self-propelled and other vehicles so that on a portion of the appliance, hereafter called a feeler, being moved by striking an obstacle or by being released by hand, another appliance hereafter termed the catcher is instantly released and positions itself to pick up the object struck clear of the ground, while at the same time the engine is stopped by cutting off the electric current to the sparking plug, the back or driving wheels are braked and a second feeler and catcher, (if employed) which is located in front of the back wheels, actuated. The feeler and the catcher when used with wheels carried by separate stubs, such as the front or steering wheels of the present type of automobiles, are so constructed that they both accommodate themselves to the varying movements of the steering wheels to efficiently protect same and the space between under all conditions of movement. Where both a front and a rear feeler and catcher are employed, the rear feeler and catcher may be of a more rigid character and capable of movement in one direction only, since the back wheels are mounted on a relatively fixed axle, and they may be so connected with the feeler and catcher for the front wheels and with the brake and the cut out, that when the feeler is struck, it will operate appliances to release the front feeler and catcher and the brakes, and also break the electric current, in the same manner as if the front feeler had been struck.

My invention will be readily understood from the following description aided by the annexed drawings in which:

Figure 1 is a front elevation of the steering wheels of an automobile, with the front feeler and catcher ready for action, and showing the position of the chassis frame. Fig. 2 is a side sectional elevation of the chassis frame, showing the feeler and catcher and their appliances fitted to both front and back wheels and ready for action, the braking appliances being also shown. Fig. 3 is a similar view to Fig. 2, but showing the feelers and catchers in operative position. Fig. 4 is a plan view of Fig. 3, but showing the front wheels at an angle as in the act of turning the vehicle, this showing the position the front feeler and catcher and their appliances occupy when the wheels are in that position. Fig. 5 is a detail view of the front feeler and one guide rod.

In all the above figures, appliances not constituting the subject of this invention, such as steering gear, springs, etc., are not shown, but their construction and position will be readily understood by any person skilled in the art.

The invention will first be described as for the front steering wheels, and without the feeler and catcher for the back wheels, as it is optional whether or not the feeler and catcher for the back wheels be employed, since in some cases ordinary side guards may be employed between the front and back wheels.

According to the invention, an arm 1 is pivotally connected to each steering stub 2 carrying a front wheel 3, and at the end of each arm is formed an eye 4, through each of which a guide rod 5 is passed, these guide rods 5 being pivotally connected at their front ends to the feeler 6, the front edge of which is provided with rollers 7, so that when the front edge of the feeler 6 is on the ground, it will easily ride on same.

Pivoted to the chassis frame 7, are two bent levers 8 the fore ends of which are connected together to form a frame 9, on which the feeler 6 is supported and has an endwise sliding movement, the levers 8 only having an up and down movement about their pivots. The frame 9 is narrower than the feeler 6.

Pivotally attached to the levers 8 are links 9ª, which are connected with a horizontal rock-shaft 10, journaled in bearings on the chassis 7, and to this shaft are secured rocking levers 11 having rollers 12 at the lower part of their ends for engaging levers 13 on the catcher, as hereafter explained. The shaft 10 is also connected with the front end of a rod 14, or equivalent rope or chain, which is disposed longitudinally of the chassis and is connected at its rear end to an arm 15 that is affixed to a second rock shaft 16 journaled in bearings 17 on the chassis. From this shaft 16 depend hooks 18, for engaging a rod 19 connecting the radial arms 20 provided upon a pair of rings 21, which rings encircle eccentric disks 22 fixed on the casing 23 of the axle 24, or on some other fixed part of the vehicle adjacent to the said axle.

On the rods 19 are positioned brake blocks 25, which engage drums 26 on the rear wheels 3, for braking the vehicle, as hereafter explained.

On the rod 14, is a contact piece 27 which when the parts are in normal position, makes connection with other contacts 28 and completes the circuit wherein the sparking plugs of the engine and the battery or magneto are included, but which, when the rod is moved endwise serves to open such circuit.

The front catcher consists of two frames, each composed of strips 29 hinged together to end pieces 30.

The back frame has its end pieces pivotally connected to guards 31 which encircle the front portion of the wheels and are pivotally connected to the axles. The other or front frame has its end pieces pivotally connected to plates 32 which lie in the same plane as the frame and are hinged at the upper part to the lower edge of the guards 31, said plates having rollers 32ª at their bottom edges which ride upon the feeler 6, as seen in Figs. 1 and 4. The back frame rests upon slotted rods 33 which are connected by upright pivots 34 to a frame 35 pivotally suspended beneath the front member 36 of the chassis carrying the bearings for the axle stubs 2, said frame 35 having attached thereto the levers 13 which are engaged by the rollers 12 for lifting the catcher. By reason of this construction, the catcher will move with the steering wheels in any direction, and will always be in position to coöperate with the feeler in forming an effectual protection for the front of the vehicle.

Under ordinary conditions, the feeler, catcher and brakes are in the position shown in Fig. 2, but should an obstacle a person, be struck by the feeler 6, the latter will immediately be pushed backward, the guides 5 sliding in the eyes 4 and the levers rocking the levers 11 in the same direction, through the agency of the links 9ª, thus disengaging said levers 11 from the levers 13. This disengagement permits the front edge of feeler 6 to fall and ride on the ground, while the catcher, being released, will likewise fall, its front end riding along the feeler until both frames lie flat, as seen in Fig. 3, thus forming a complete catcher to pick up the obstacle, the catcher in falling bringing down the guards 31. At the same time as the release of the levers 13, the contacts 27 and 28 have been disconnected and the electric current is cut off from the sparking plug to stop the engines; also the rod 14 disengages the hooks 18 from the rod 19, whereupon said rod and the arms 20 on the rings 21 drop by their own weight, and by reason of the position of the fixed eccentric disks 22, the said rings 21 bring the brake blocks 25 against the drums 26, thereby effecting the braking. Now should it be necessary to place a feeler and catcher in front of the back wheels, such feeler may be constituted by a vertical grid 42, pivoted at its upper end to the chassis, while the catcher 38, which may have the form of an ordinary fender, is pivoted to brackets 39 depending from the axle casing and is provided with a bar 40 which is engaged by depending hooks 41 pivoted to the chassis. The feeler 42 is connected by a link 43 to one end of a rocking lever 44 which is pivoted to the chassis and connected at its other end to the rod 14, and said feeler is also connected by a pair of links 45 with the hooks 41. The said feeler is disposed in front of the catcher, so that on being either struck by an obstacle, or actuated by the rod 14, the feeler will be rocked or swung rearwardly and the links 45 will release the hooks 41. The catcher will then fall and ride upon the ground and, on reaching the obstacle, will pass underneath it and lift it off the ground and up against the feeler, which then occupies the position shown in Fig. 3, as will be understood. This movement of the back feeler will operate the front catcher, or the front catcher will operate the back feeler and catcher by moving the rod 14.

By continuing the upper part of the lever 11 in the form of a handle, the appliance can be operated by hand or foot from the driver's seat.

What I do claim as my invention and desire to secure by Letters Patent is:—

1. A vehicle fender consisting, in combination, of a rocking feeler; a pair of depending, pivotally-mounted, supporting means engaging the front end thereof; a rocking catcher arranged directly above said feeler and provided with rearwardly-projecting detent means; trip-means normally engaging said detent means, to hold said catcher and said feeler end in raised position; and connections between said supporting means and said trip means for disengaging the latter from said detent means when said feeler is actuated; to permit said feeler end and said catcher to drop.

2. A vehicle fender consisting, in combination, of a pivotally-mounted feeler; a pair of depending, pivotally-mounted levers supporting the front end thereof; a rocking catcher arranged directly above said feeler and provided with rearwardly-projecting detent levers; a pair of depending, pivotally-mounted trip levers normally engaging said detent levers, to hold said catcher and said feeler end in raised position; and connections between said supporting levers, and said trip levers for disengaging the latter from said detent levers when said feeler is actuated; to permit said feeler end and said catcher to drop.

3. A vehicle fender consisting, in combination, of a feeler; a catcher supported thereon and embodying a pair of hinged sections; means for normally supporting said feeler and catcher in raised position; and means for automatically releasing said supporting means when said feeler is actuated, to permit the latter and said catcher to drop.

4. A vehicle fender consisting, in combination, of a feeler; a catcher supported thereon and embodying front and rear sections hinged together, the front section normally resting on said feeler; means for normally supporting said feeler and catcher in raised position; and means for automatically releasing said supporting means when said feeler is actuated, to permit the latter and said catcher to drop.

5. A vehicle fender consisting, in combination, of a feeler; a catcher supported thereon and embodying front and rear sections hinged together, the front section normally resting on said feeler; rearwardly-projecting detent means connected with the rear section; trip means normally engaged with said detent means for supporting said feeler and said catcher in raised position; and means for automatically releasing said trip means when said feeler is actuated, to permit both the feeler and the catcher to drop.

6. A vehicle fender comprising, in combination, pivotally-mounted front and rear feelers; a pivotally-mounted catcher associated with each feeler; trip means associated with each catcher for normally holding the same in inoperative position; connections between each feeler and the adjacent trip means for releasing the latter when the former is actuated, to permit said catcher to move into operative position; and connections between said trip means for causing the same to operate in unison.

7. A vehicle fender comprising, in combination, a feeler; a catcher associated therewith and embodying front and rear, hingedly-connected frames; guards adapted to encircle the front portion of the wheels and to which the ends of the rear frame are pivotally connected; plates hinged to the lower front edges of said guards and having the ends of the front frame pivoted thereto; means for normally holding said catcher in inoperative position; and means for automatically releasing said holding means when the feeler is actuated.

8. A vehicle fender comprising, in combination, a feeler; a catcher associated therewith; guards adapted to encircle the front portion of the wheels; plates hinged to the lower front edges of the guards, said plates and guards having the adjacent portions of the ends of said catcher pivotally connected thereto; means for normally holding said catcher in inoperative position; and means for automatically releasing said holding means when the feeler is actuated.

In testimony whereof I have hereunto set my hand in presence of two subscribing witnesses.

WILLIAM SAY.

Witnesses:
WM. O. BROWN,
FRED L. HUTCHINS.